Oct. 14, 1952     W. O. BECHMAN     2,614,006
LUBRICATING SYSTEM ON TRACK ROLLER
Filed May 5, 1950
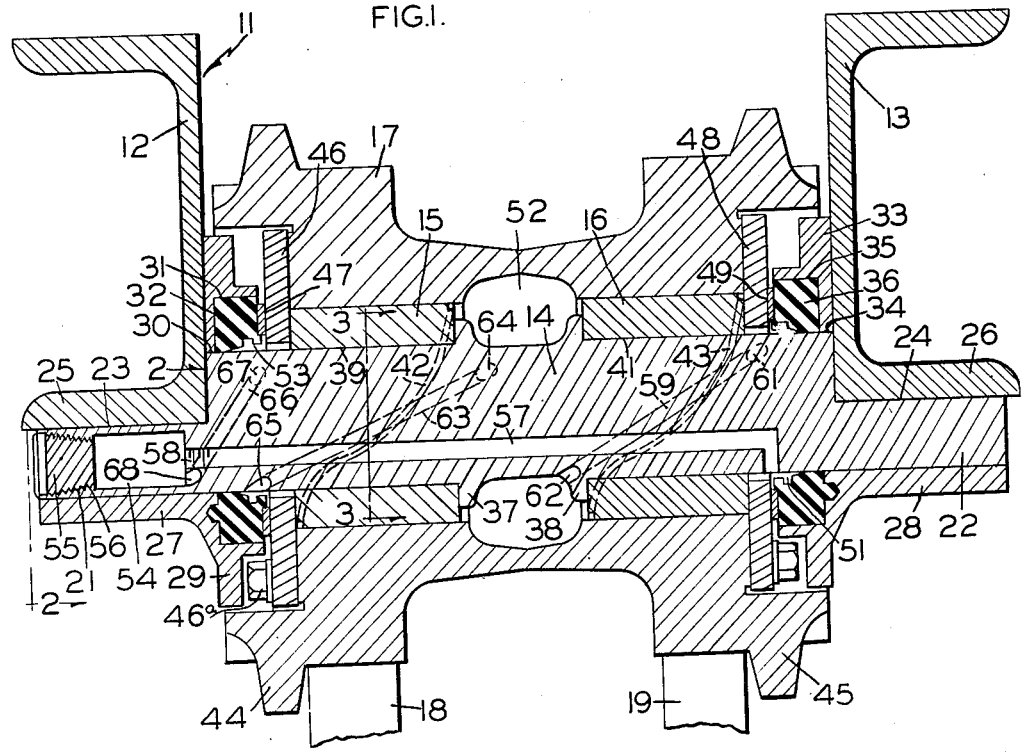
INVENTOR
WILLIAM O. BECHMAN
ATT'Y

UNITED STATES PATENT OFFICE 2,614,006

LUBRICATING SYSTEM ON TRACK ROLLER

William O. Bechman, Chicago, Ill., assignor to International Harvester Company, a corporation of New Jersey Application May 5, 1950, Serial No. 160,373

5 Claims. (Cl. 308—109)

This invention has to do with track roller assemblies utilizable upon the track frames of crawler tractors, and more particularly concerns an improved type of bearing and lubricating passage construction for such assemblies.

Supporting rollers for crawler tractor vehicles and which roll upon the upper side of the ground-engaging flights of endless tracks for such vehicles operate under conditions requiring that they be copiously lubricated. These rollers are frequently subjected to high pressure shock loads. They also are rotated at high speed and because of their earth-contiguous environment are sometimes poorly ventilated, and at other times heat dissipation is retarded by hot dusty or loose soil ambient to the rollers. These dust particles would have a deleterious abrasive action on the bearing surfaces if allowed to come in contact therewith. Another potential source of abrasive particles is muddy water in which the rollers are commonly immersed during operation of the vehicle. It is imperative, therefore, that the bearings for these rollers shall be thoroughly sealed for preventing ingress of foreign particles and that the lubricating system be capable of completely loading lubricant-receiving interstices within the bearing after which the lubricant inlet shall be tightly closed.

The track rollers and bearings are conveniently accessible only from the outer end of bearing shafts which are mounted in the track frame wherefore a further limitation upon the design of the lubricating passage system for these bearings is that they shall be capable of complete lubricant servicing through an inlet port at the outer ends of their shafts. Assurance that lubricant is supplied to the bearing passages and lubricant-receiving chambers in sufficient quantity has heretofore been accomplished in bearing assemblies using roller bearing units by causing the lubricant to be delivered to the bearing assembly at the remote side of the roller bearing unit most remote from the outer end of the shaft and then to feed back between the rollers of the roller bearing units to an outlet passage which also communicates with the outer end of the shaft, wherefore when lubricant is forced into the inlet passage by pressure, lubricant will eventually be discharged through the outlet passage adjacently to the inlet passage as a convenient manifestation to the operator when the bearing has been completely lubricated. A prior system of this character is shown in U. S. Patent No. 2,283,871, Norelius.

An important object of this invention is the adaptation of this type of lubricating system to a track roller assembly employing sleeve bearings instead of roller bearing units. This has been accomplished by placing passages in the roller supporting shaft which is secured non-rotatively in the track frame. The lubricant can return through these passages instead of through the spaces between the roller bearing unit rollers.

A further object is the provision of a track roller and bearing assembly wherein there are annular receiving chambers extending about and spaced lengthwise of the roller supporting shaft and wherein there is a lubricant transfer passage extending diagonally downwardly through the shaft from an upper portion of one of such chambers into the bottom of which lubricant is first admitted so that as the level of the lubricant rises the air is forced from this chamber to facilitate it being filled with lubricant preceding discharge of the lubricant through the diagonal passage. By this control of the flow of lubricant admitted into the track roller and bearing assembly, minimization of air pockets and complete filling of the lubricant-receiving chambers with lubricant is assured.

A further object is the provision of a track roller and bearing assembly wherein there are a plurality of axially spaced sleeve bearings extending about a non-rotatable shaft and wherein axially spaced annular lubricant-receiving chambers at the ends of these bearing sleeves are serially connected by lubricant transfer passages serially inter-communicative and leading diagonally downwardly through the shaft from the upper part of an annular chamber at one end of the bearing to the lower part of the lubricant-receiving chamber at the opposite end of such bearing to supply this latter chamber with lubricant which is dischargeable therefrom through a diagonal passage leading diagonally downwardly through the shaft from an upper part of this second lubricant-receiving chamber adjacently to an end of a second sleeve bearing to the lower part of an annular lubricant-receiving chamber at the opposite end of the second sleeve bearing, facilitating complete and successive filling of the lubricant chambers which are inter-communicative through these diagonal passages.

Still another object is the provision of a track roller and bearing assembly wherein there is a shaft non-rotatively supported in a track frame together with sleeve-bearing means non-rotatively supported upon the shaft and a track roller journalled upon the sleeve bearing means, and the sleeve-bearing means being of a bearing material which is softer than the material from which the roller is formed so that the occurrence of wear takes place upon the lower cylindrical half of the outer periphery of the sleeve bearing means wherefore this periphery will remain semi-cylindrical and truly conformed to that part of the cylindrical inner periphery of the roller with which it engages. A large constant area of bearing contact surface is thus assured.

With the above objects in view attention is now invited to the drawings, wherein:

Fig. 1 is a transverse sectional view taken through a crawler tractor track frame and axially through a track roller and bearing assembly mounted in this frame.

Fig. 2 is an end view of the roller shaft of the bearing assembly in Fig. 1 and taken as indicated by the irregular line 2—2 in Fig. 1.

Fig. 3 is a fragmentary sectional view taken at the line 3—3 in Fig. 1, illustrating the position of a lubricant inlet passage and a lubricant transfer passage in the roller supporting shaft.

Fig. 4 is a fragmentary view taken similarly to Fig. 1 but showing a modified lubricating passage arrangement in the roller-supporting shaft.

Fig. 5 is an end view of the shaft shown in Fig. 4 and taken as indicated by the irregular line 5—5 of Fig. 4.

The track frame shown in Fig. 1 is generally designated 11 and comprises two laterally spaced parallel channel members 12 and 13. Crawler tractor vehicles employ one of these track frames 11 along each side where the channel 12 is disposed laterally outermost with respect to the vehicle. Each track frame 11 carries a plurality of roller supporting shafts 14 spaced lengthwise thereof and each of these shafts has sleeve-bearing means in the form of axially spaced sleeve bearings 15 and 16 upon which there is journalled a track roller 17. These rollers 17 support the track frames and the vehicle while resting upon a lowermost ground-engaging flight of an endless track comprising articulately connected links 18 and 19 which serve as rails.

The roller shaft illustrated in Figs. 1, 2 and 3 has end extensions 21 and 22 which are semi-circular in cross section with flat upper faces 23 and 24. These two faces 23 and 24 are held firmly against the flat under sides of lower flanges 25 and 26 of the frame channel members 12 and 13 by hanger brackets 27 and 28 which are bolted to the flanges 25 and 26 by cap screws, not shown. The inner end portion 29 of the bracket 27 is circular and has a center hole 30 for receiving the outer end of the large diameter portion of the shaft 14. This portion 29 of the hanger bracket also contains a cavity 31 for receiving a sealing element 32. An annular inner-end portion 33 of the hanger bracket 28 contains an opening 34 which receives an opposite end of the larger diameter portion of the shaft 14 and also has a cavity 35 which contains and holds a sealing element 36.

The shaft 14 embodies two annular circumscribing ribs 37 and 38. A bearing-supporting annular surface 39 is formed between the abutment rib 37 and the outer end of the shaft whereas a bearing-supporting annular portion 41 is formed between the rib 38 and the inner end of the shaft. Bearing sleeves 15 and 16, preferably of bronze, are respectively non-rotatively mounted upon the shaft portions 39 and 41 in abutment with the ribs 37 and 38. Each of these sleeve bearings contains a helical lubricant-receiving groove of which that in the bearing 15 is designated 42, and that in the bearing 16 is designated 43. The roller 17 is journalled upon the sleeve bearings 15 and 16. Peripheral flanges 44 and 45 of the roller prevent it from moving laterally off of the track formed by articulately connected links 18 and 19. The recessed outer end of the roller 17 contains and has an annular mounting plate 46 secured thereto by a ring of cap screws 46a. This mounting plate has a sealing ring 47 secured thereto in sliding sealing relation with the sealing element 32. A similar construction at the inner end of the roller 17 includes an annular mounting plate 48 and a sealing ring 49 in sliding sealing engagement with the sealing element 36.

An annular lubricant-receiving chamber 51 is formed adjacently to the inner end of the shaft 14 where such chamber is bounded by a cylindrical portion of the shaft and the elements 36, 48 and 49 spaced radially therefrom. A second annular lubricant-receiving chamber 52 extends about the central port of the shaft between the ribs 37 and 38 and is enclosed by the shaft and the hollow central part of the roller 17. A third annular lubricant-receiving chamber 53 is formed near the left or outer end of the shaft 14 between the annular periphery thereof and the elements 32, 46 and 47 spaced radially therefrom.

A recess 54 in the outer end of the shaft 14 is normally closed by a threaded plug 55 turned into a threaded section 56 of said recess. A lubricant inlet passage 57 leads axially inwardly of the shaft from the bottom of the recess 54 and the outer end of the passage 57 is threaded at 58 to facilitate attachment of a lubricant gun tip in communicative relation with the passage 57 subsequent to removal of the plug 55. The inlet passage 57 communicates with the annular lubricant-receiving chamber 51 at a lower portion thereof. A lubricant transfer passage 59 extends diagonally downwardly through the shaft 14 from an upper end or port 61 communicating with an upper portion of the chamber 51 and communicates with a lower portion of the annular chamber 52 through a port 62. A second diagonal transfer passage 63 communicates with an upper portion of the chamber 52 through a port 64 and leads axially of the shaft and diagonally downwardly therein into communication with the chamber 53 through a port 65. A third diagonal transfer passage 66 communicates with an upper portion of the chamber 53 through a port 67 and leads axially of the shaft and diagonally downwardly therein into communication with the recess 54 through a port 68.

After the parts have been assembled, as illustrated in Fig. 1, lubricant is introduced into the assembly by unscrewing the plug 55 and attaching the tube of a pressure lubricating device, not shown, with the threaded part 58 of the passage 57. Lubricant is then forced inwardly through the passage 57 into the lower part of the annular chamber 51. As the lubricant lever rises air is forced from the chamber 51 outwardly through the transfer passage 59 until the chamber 51 is substantially filled whereupon the lubricant will flow through the chamber 51 and outwardly through the transfer passage 59 into the annular chamber 52. The bottom of this chamber 52 fills first and as the lubricant rises in this chamber, air is expelled therefrom through the passage 63 into the lower part of the annular chamber 53 until the chamber 52 is substantially filled with lubricant, whereupon the lubricant will commence to flow downwardly through the passage 63 into the lower part of the annular chamber 53. The chamber 53 has the air expelled therefrom through the passage 66 as the lubricant rises in this chamber, and, subsequent to the filling of this chamber with lubricant, continued forcing of lubricant inwardly through the passage 57 causes discharge of lubricant through the port 68 into the recess 54 where it can be detected by the operator to manifest that the roller and bearing assembly is properly serviced. Thereupon the operator will detach the lubricant pressure device and replace the plug 55. Subsequent periodic servicing of the assembly is accomplished in the same way. Incident to such servicing the operator can replace a substantial portion of impaired or deteriorated lubricant by forcing it from the bearing assembly pursuant to forcibly introducing fresh lubricant to the passage 57.

Although in the complete structure illustrated in Fig. 1 the passage 59 has been termed a "transfer passage" for transmitting lubricant from the annular chamber 51 to the annular chamber 52, this passage 59 serves as a lubricant discharge passage for the chamber 51. Likewise the diagonal passages 63 and 66 serve as discharge passages for the annular chambers 52 and 53, respectively. Collectively the diagonal passages 59, 63 and 66 function as a discharge passage for the annular chamber 51, and, passages 63 and 66 can be regarded as an outlet passage for the chamber 52. While the component 66 of such outlet passage leads diagonally of the shaft into the recess 54, such component 66 also leads axially of the shaft and in this respect can be referred to as a passage leading axially into the shaft. The inlet passage 57 serves the annular storage chamber 51 and with the diagonal passage 59 serves as an inlet passage for the annular chamber 52. Passage components 57, 59 and 63 collectively form an inlet passage for the annular chamber 53.

The second embodiment, shown in Figs. 4 and 5, differs from that in Figs. 1, 2 and 3 only in the arrangement of passages 57' and 66' which respectively correspond to the passages 57 and 66 in the first embodiment. In this second embodiment the passage 66' is L-shaped with a leg 166 leading downwardly from the upper part of the annular chamber 53' into connection with a horizontal leg 167 which is directed horizontally through the bottom of the shaft recess 54'. Those parts in the Figs. 4 and 5 embodiment, identical with or corresponding to parts in the first embodiment are designated by the same respective reference characters with the addition of a "prime" to expedite this disclosure. By using the L-shaped passage 66' it is possible to place the port 68' of the passage 66' at the same elevation as the passage 57' while maintaining the port 67' in an upper peripheral part of the shaft 14' without causing the passage 66' to have critical proximity with the intersection 168 of the upper face 23' with the semi-circular end face 169 of the shaft.

Having thus described a limited number of embodiments of the invention with the view of clearly and concisely illustrating the same, I claim:

1. In a track roller and bearing assembly, a track frame, a horizontal shaft mounted non-rotatably in said frame, said shaft having a lubricant inlet passage extending axially inwardly from an end thereof and a lubricant outlet passage also extending axially inwardly from said end of the shaft, a sleeve bearing mounted upon said shaft, a track-engaging frame-supporting roller journalled upon said sleeve bearing, there being annular lubricant receiving chambers formed between the shaft and roller at opposite ends of said bearing, said inlet passage communicating with the chamber spaced most distantly from said end of the shaft, said outlet passage communicating with an upper portion of the chamber less distantly from said end of the shaft, and a lubricant transfer passage extending diagonally downwardly through the shaft from an upper portion of the first chamber to a lower portion of the second chamber.

2. For use in a track roller and bearing assembly, a shaft having a normally lower side, said shaft also having an annular bearing supporting surface extending about a portion thereof between its ends, a lubricant transfer passage extending diagonally downwardly through the shaft from a position adjacently to one end of the bearing supporting surface to a position adjacently to the other end of the bearing supporting surface, said positions at the opposite ends of the diagonal passage being between such bearing supporting surface and respective ends of the shaft, an inlet passage leading from one end of the shaft to the lower side thereof in substantial circumferential registration with the upper end of the diagonal passage, and an outlet passage for communication with the lower end of the diagonal passage and including a portion extending into the shaft from said one end thereof.

3. For use in a track roller and bearing assembly, a shaft having a normally lower side, said shaft also having an annular bearing supporting surface extending about a portion thereof between its ends, a lubricant transfer passage having an upper end adjacently to the upper side of the shaft between an end of the shaft and one end of the bearing supporting surface and extending diagonally downwardly through the shaft where such passage has a lower end adjacently to but outwardly from the opposite end of the bearing supporting surface, a lubricant inlet passage leading inwardly from one end of the shaft and emerging therefrom at a lower side thereof at a position in substantially circumferential registration with the upper end of the diagonal passage; and lubricant discharge passage means including a passage in said shaft and having an end communicating with an upper side of the shaft in substantial registration with the lower end of the diagonal passage circumferentially of the shaft, and said discharge passage having an outlet communicating with said one end of the shaft.

4. A track roller shaft having upper and lower sides extending lengthwise thereof, a bearing supporting portion extending about an intermediate portion of the shaft, lubricant-chamber wall forming portions circumscribing the shaft at opposite ends of the bearing-supporting portion, a diagonal passage leading downwardly through the shaft from an upper end of one of the wall forming portions to the other wall forming portions, an inlet passage extending axially inwardly through an end of the shaft and emerging therefrom at the lower side thereof in the one chamber wall forming portion; and lubricant discharge passage means including a channel portion leading into the shaft through the upper side thereof at the other chamber wall forming portion and a passage portion emerging from the shaft at said end thereof.

5. A track roller shaft having upper and lower sides extending lengthwise thereof and axially spaced bearing supporting surfaces extending thereabout, a central lubricant-chamber wall forming portion extending about the shaft between the bearing supporting surfaces and annular lubricant-chamber wall forming portions extending about the shaft respective at the outer ends of the bearing supporting surfaces, a lubricant inlet passage extending inwardly through an end of the shaft and emerging therefrom at the lower side in the annular wall forming portion most distantly from said end of the shaft, and a lubricant outlet passage including a passage portion extending diagonally downwardly through the shaft from the upper side thereof at a point of registration with said most distant wall forming portion through the lower side of the shaft at a point of registration with the central wall forming portion, a second diagonal passage portion extending diagonally downwardly through the shaft from a position at the upper side thereof in registration with the central wall forming portion through the lower side of the shaft in registration with the other annular wall forming portion adjacently to the one end of the shaft, and a passage portion extending through the shaft and communicating between the upper side of said other annular chamber wall forming portion and said end of the shaft.

WILLIAM O. BECHMAN.

REFERENCES CITED

The following references are of record in the file of this patent:

UNITED STATES PATENTS

| Number | Name | Date |
|---|---|---|
| 501,657 | Palmer | July 18, 1893 |
| 1,161,905 | Stewart | Nov. 30, 1915 |
| 2,394,889 | Blanchard | Feb. 12, 1946 |